United States Patent
Ishii

(10) Patent No.: US 8,842,561 B2
(45) Date of Patent: Sep. 23, 2014

(54) USER EQUIPMENT TERMINAL AND COMMUNICATION CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 572 days.

(21) Appl. No.: 12/935,332

(22) PCT Filed: Apr. 10, 2009

(86) PCT No.: PCT/JP2009/057369
§ 371 (c)(1),
(2), (4) Date: Nov. 11, 2010

(87) PCT Pub. No.: WO2009/128404
PCT Pub. Date: Oct. 22, 2009

(65) Prior Publication Data
US 2011/0044196 A1 Feb. 24, 2011

(30) Foreign Application Priority Data
Apr. 14, 2008 (JP) .................. 2008-105062

(51) Int. Cl.
| | | |
|---|---|---|
| G01R 31/08 | (2006.01) | |
| H04W 4/00 | (2009.01) | |
| H04L 1/16 | (2006.01) | |
| H04L 1/18 | (2006.01) | |
| H04W 28/04 | (2009.01) | |

(52) U.S. Cl.
CPC .............. H04L 1/1692 (2013.01); *H04L 1/1812* (2013.01); *H04W 28/04* (2013.01)
USPC .............................. 370/252; 370/328; 370/389

(58) Field of Classification Search
None
See application file for complete search history.

(56) References Cited

U.S. PATENT DOCUMENTS

| | | | | |
|---|---|---|---|---|
| 2005/0265250 A1* | 12/2005 | Gollamudi et al. | ........... | 370/252 |
| 2007/0024559 A1* | 2/2007 | Ahn et al. | ........... | 345/89 |
| 2007/0250638 A1* | 10/2007 | Kiran et al. | ........... | 709/236 |
| 2008/0056179 A1* | 3/2008 | Kim et al. | ........... | 370/328 |
| 2008/0194283 A1* | 8/2008 | Chaponniere | ........... | 455/522 |
| 2008/0273469 A1* | 11/2008 | Dick et al. | ........... | 370/242 |

FOREIGN PATENT DOCUMENTS

| | | |
|---|---|---|
| JP | 2004-64691 A | 2/2004 |
| JP | 2006-262357 A | 9/2006 |

OTHER PUBLICATIONS

Patent Abstracts of Japan, Publication No. 2004-064691, dated Feb. 26, 2004, 1 page.
Patent Abstracts of Japan, Publication No. 2006-262357, dated Sep. 28, 2006, 1 page.
3GPP TR 25.814 V7.0.0, "Physical Layer Aspects for evolved Universal Terrestrial Radio Access (UTRA)," Jun. 2006, 126 pages.

(Continued)

*Primary Examiner* — Yemane Mesfin
*Assistant Examiner* — Christine Duong
(74) *Attorney, Agent, or Firm* — Osha Liang LLP

(57) ABSTRACT

A user equipment terminal for communicating with a base station apparatus using HARQ for uplink includes a transmission unit configured to transmit an uplink signal to the base station apparatus; a reception unit configured to receive a control signal indicating whether the uplink signal is to be retransmitted; and a decoding unit configured to consider the control signal as ACK when signal reliability of the control signal is low, and determine whether the control signal indicates ACK or NACK based on information in the control signal when the signal reliability of the control signal is high.

5 Claims, 13 Drawing Sheets

(56) References Cited

OTHER PUBLICATIONS

3GPP TS 36.211 V8.1.0, "Evolved Universal Terrestrial Radio Access (E-UTRA); Physical Channels and Modulation," Nov. 2007, 54 pages.

3GPP TR 36.300 V8.2.0, "Evolved Universal Terrestrial Radio Access (E-UTRA) and Evolved Universal Terrestrial Radio Access Network (E-UTRAN), Overall description," Sep. 2007, 109 pages.

3GPP TR 36.321 V8.1.0, Evolved Universal Terrestrial Radio Access (E-UTRA) Medium Access Control (MAC) protocol specification, Mar. 2008, 30 pages.

International Search Report issued in PCT/JP2009/057369, mailed on Jul. 14, 2009, with translation, 7 pages.

Written Opinion issued in PCT/JP2009/057369, mailed on Jul. 14, 2009, 3 pages.

\* cited by examiner

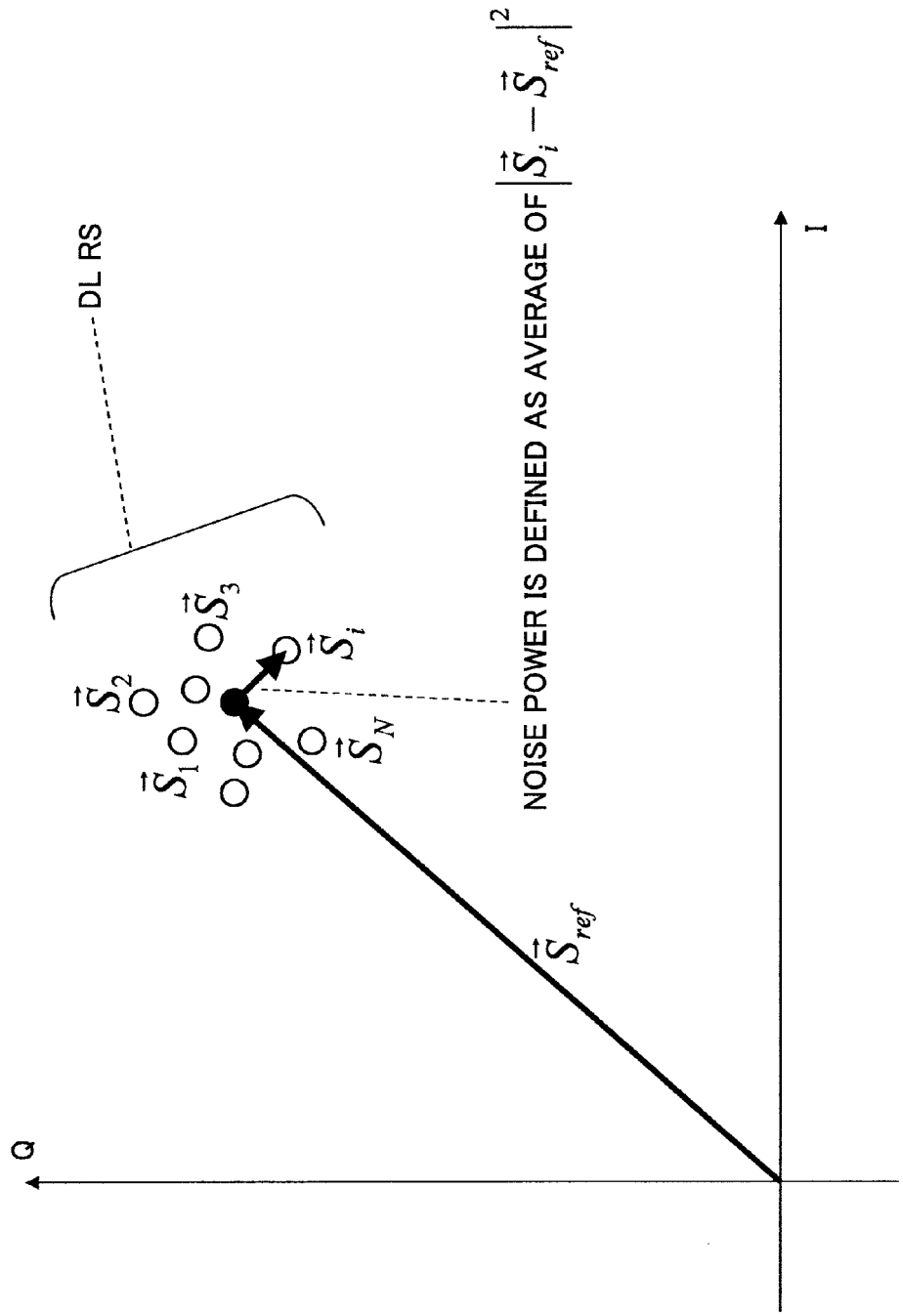

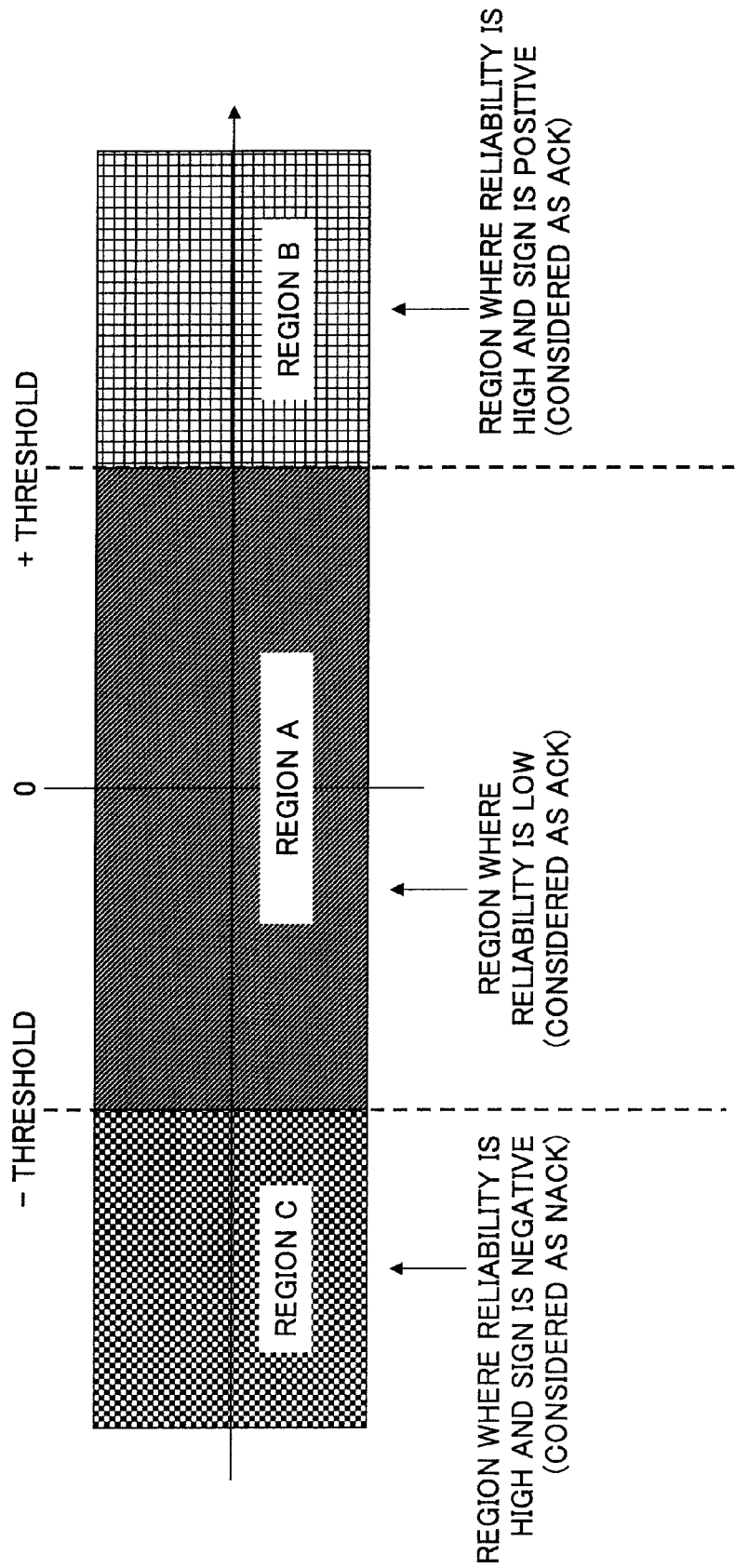

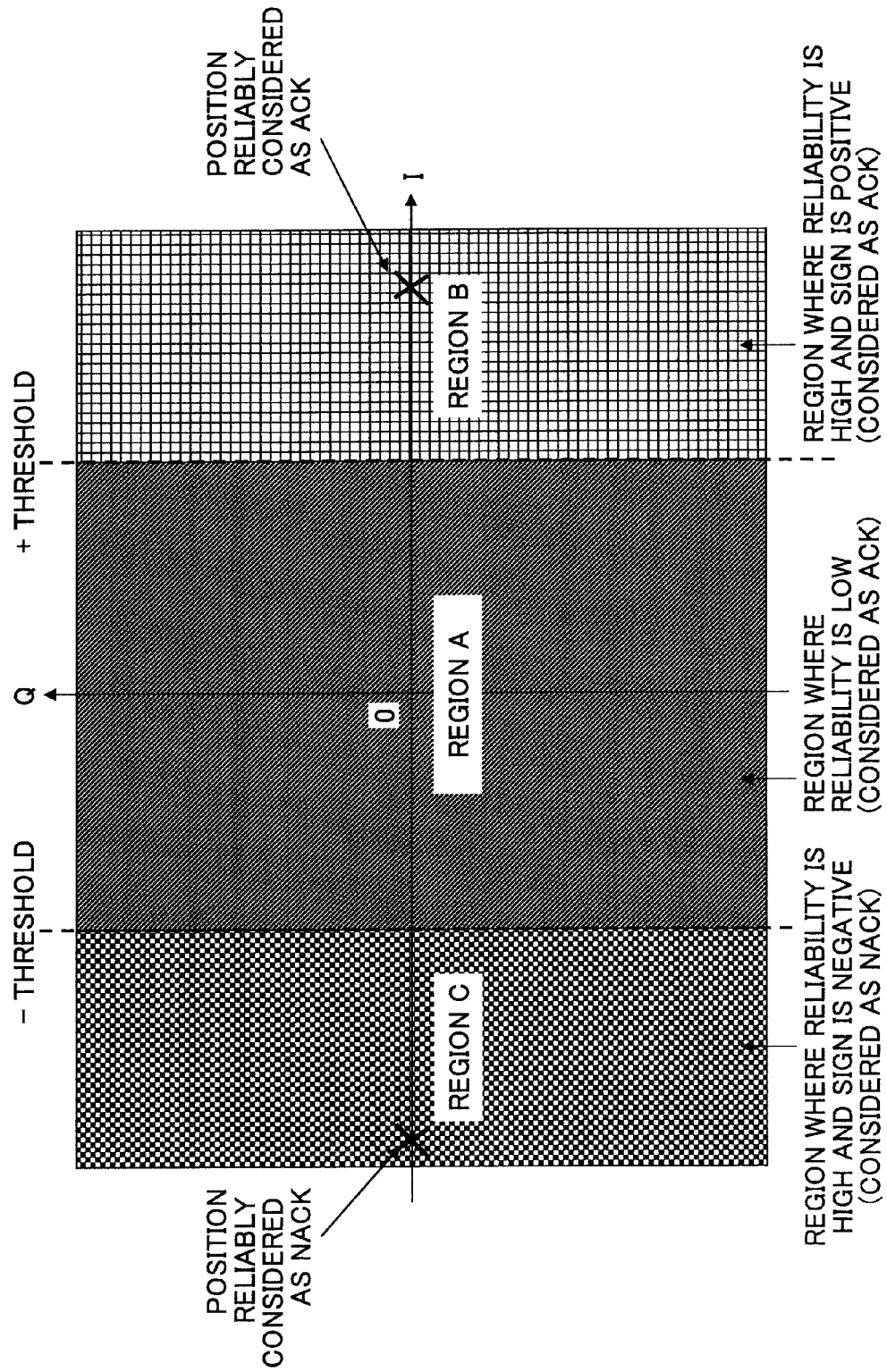

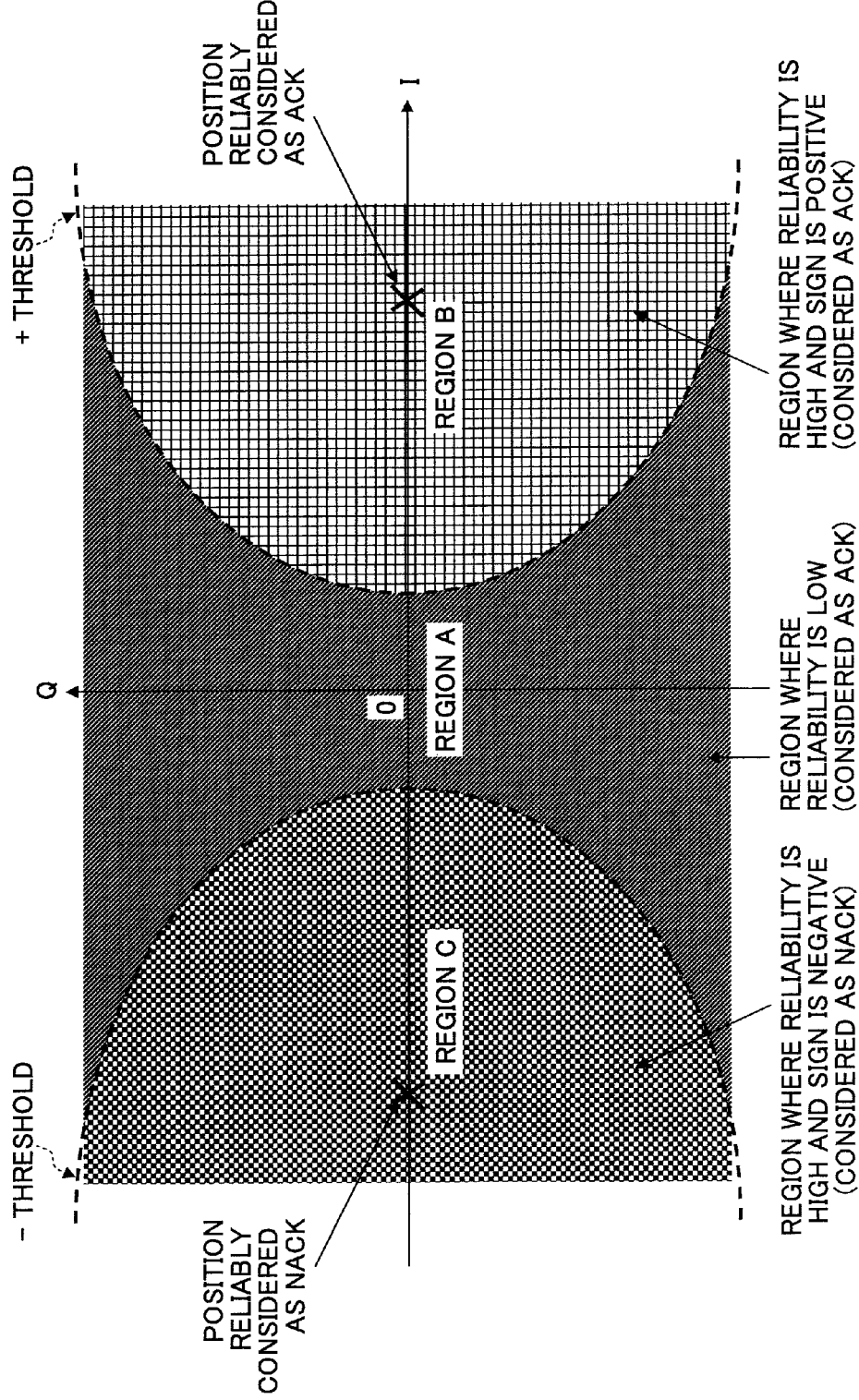

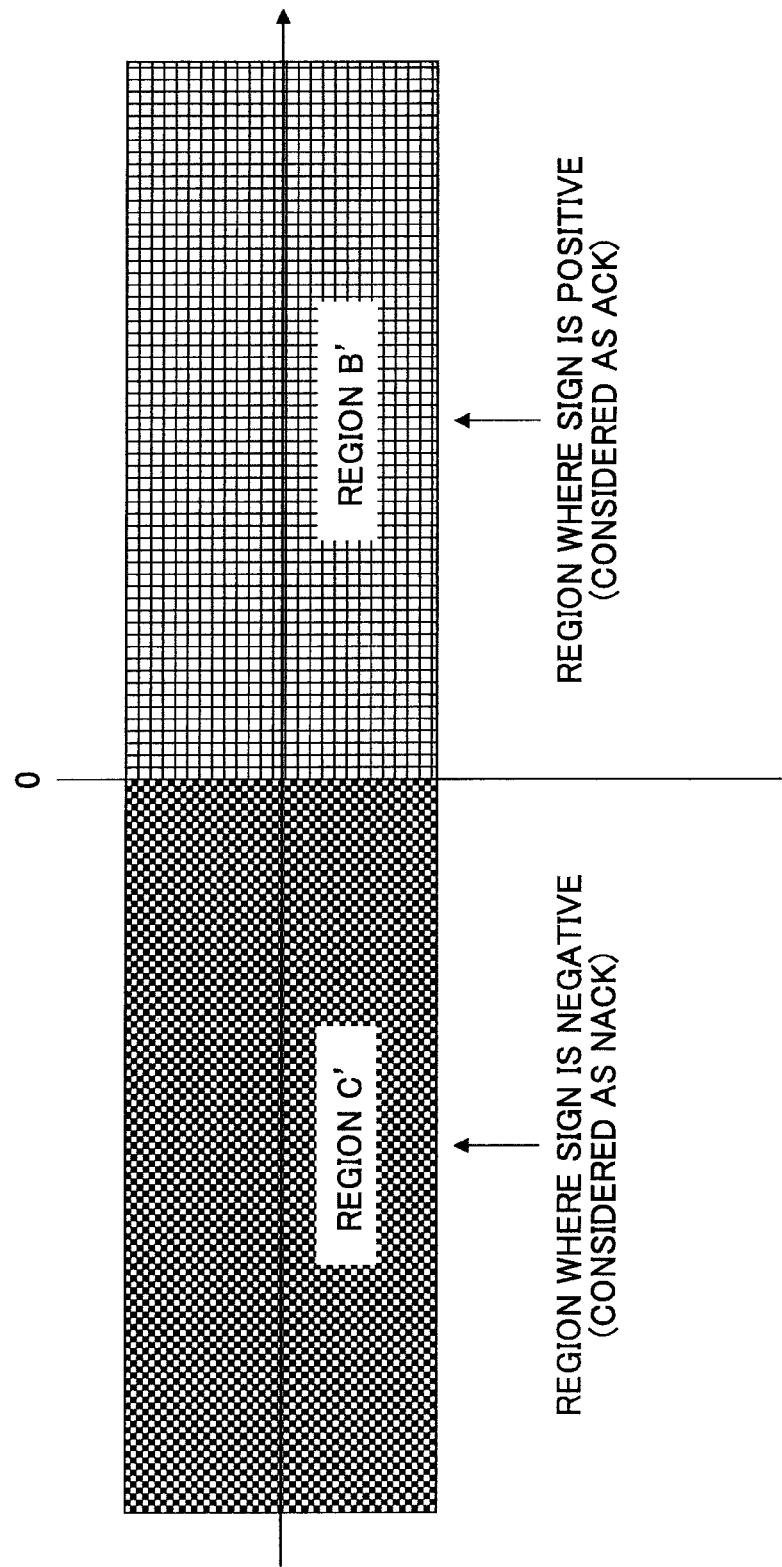

USER EQUIPMENT TERMINAL AND COMMUNICATION CONTROL METHOD

TECHNICAL FIELD

The present invention relates to a mobile communication system employing HARQ (Hybrid Automatic Repeat reQuest) control, and more specifically relates to a user equipment terminal.

BACKGROUND ART

In this type of technical field, next-generation communication schemes, which may become successors of W-CDMA (Wideband Code Division Multiple Access) or HSDPA (High Speed Downlink Packet Access) systems, are being discussed by W-CDMA standardization group called 3GPP (The 3rd Generation Partnership Project). A typical one of the next-generation communication schemes is an LTE (Long Term Evolution) system. As radio access schemes in the LTE system, an OFDM (Orthogonal Frequency Division Multiple Access) scheme and an SC-FDMA (Single-Carrier Frequency Division Multiple Access) scheme are used for downlink and uplink, respectively. See non-patent documents 1 and 2, for example. For convenience, the LTE system is illustratively described below, but the present invention is not limited to the specific system.

The OFDM scheme is a multi-carrier based technique for transmitting data in several narrower frequency bands (subcarriers) resulting from segmentation of a frequency band. By arranging the subcarriers on the frequency densely without mutual interference while partially overlapping the subcarriers, it is possible to achieve fast transmissions and improve the frequency utilization efficiency.

The SC-FDMA scheme is a single-carrier based technique where Fourier transform and inverse Fourier transform are applied to segment a frequency band, so that several terminals can use the segmented different frequency bands. The SC-FDMA scheme has characteristics of reduction in inter-terminal interference, smaller variations of transmission power, and so on. As a result, it is advantageous to reduction in power consumption, wider coverage, and so on.

In LTE system, one or more physical channels are shared in both uplink and downlink communications among several mobile stations (user equipment terminals). The channel shared among the several mobile stations is generally referred to as a shared channel. In the LTE system, the shared channel is referred to as a PUSCH (Physical Uplink Shared Channel) for uplink and a PDSCH (Physical Downlink Shared Channel) for downlink. Also, transport channels mapped into the PUSCH and the PDSCH are referred to as an UL-SCH (Uplink-Shared Channel) and a DL-SCH (Downlink-Shared Channel), respectively.

Also, it is necessary in a communication system using these shared channels to signal which of the shared channels is to be assigned to which of mobile stations for each subframe. In the LTE system, the control channel for the signaling is referred to as a PDCCH (Physical Downlink Control Channel). The PDCCH is also referred to as a downlink L1/L2 control channel, a DL L1/L2 control channel, or downlink control information (DCI). The PDCCH includes information items such as a DL/UL scheduling grant and a TPC (Transmission Power Control) bit. See non-patent document 3.

More specifically, the DL scheduling grant may include downlink resource block assignment information, an ID of a user equipment (UE) terminal, the number of streams, information about precoding vectors, information about a data size and a modulation scheme, information about HARQ (Hybrid Automatic Repeat reQuest), and so on. The DL scheduling grant may be referred to as DL assignment information, DL scheduling information, and so on, for example.

Also, the UL scheduling grant may include uplink resource block assignment information, an ID of a user equipment (UE) terminal, information about a data size and a modulation scheme, uplink transmission power information, information about a demodulation reference signal, and so on, for example.

The PDCCH is mapped into the first one to three OFDM symbols in fourteen OFDM symbols within one subframe, for example. It is specified how many leading OFDM symbols the PDCCH are to be mapped into through a PCFICH described below, which is indicated to a user equipment terminal.

Also, the PCFICH (Physical Control Format Indicator Channel) and a PHICH (Physical Hybrid ARQ Indicator Channel) are transmitted in the OFDM symbols including the PDCCH.

The PCFICH is a signal indicating the number of OFDM symbols (including the PDCCH) to a user equipment terminal. The PCFICH may be referred to as a DL L1/L2 control format indicator.

The PHICH is a channel for transmitting acknowledgement information for the PUSCH. The acknowledgment information includes ACK (Acknowledgement) as a positive response and NACK (Negative Acknowledgement) as a negative response. In other words, the PHICH is a control channel for transmitting a control signal indicating whether the PUSCH is to be retransmitted according to HARQ control.

The HARQ control for the PUSCH and the acknowledgement information transmitted via the PHICH are described below. See non-patent document 4.

In the PUSCH in the LTE system, a synchronous HARQ scheme is used as one of HARQ schemes.

Specifically, as illustrated in FIG. 1, uplink shared signals are transmitted via the uplink shared channel at predetermined timings, more specifically at predetermined intervals, beginning at the first transmission timing.

In FIG. 1, uplink shared signals are retransmitted at the intervals of eight subframes. It should be noted that the uplink shared signals may be retransmitted at different intervals.

The base station apparatus instructs, via an HARQ indicator channel or an UL scheduling grant, a user equipment terminal to retransmit an uplink shared signal.

When the retransmission of the uplink shared signal is instructed via the HARQ indicator channel, in other words, when information identified in the HARQ indicator channel is NACK, the user equipment terminal retransmits the uplink shared signal using the same resource block and the same modulation scheme as those used in the previous transmission.

On the other hand, when the retransmission of the uplink shared signal is instructed via the UL scheduling grant, the user equipment terminal retransmits the uplink shared signal using a resource block and a modulation scheme as specified by the UL scheduling grant.

When the user equipment terminal receives both the HARQ indicator channel and the UL scheduling grant in a certain subframe, the user equipment terminal follows the UL scheduling grant. In this case, information identified in the HARQ indicator channel is discarded.

Referring to FIG. 2, HARQ control for uplink in the LTE system is described in detail below. FIG. 2 illustrates an example of HARQ control for uplink.

As illustrated in FIG. 2, at 202 (in a subframe #i where i is a positive integer), using an uplink scheduling grant in the physical downlink control channel, the base station apparatus instructs the user equipment terminal to communicate using the uplink shared channel in a subframe #i+4.

At 204 (in the subframe #i+4), the user equipment terminal transmits an uplink shared signal to the base station apparatus. The base station apparatus receives and attempts to decode the uplink shared signal.

At 206 (in a subframe #i+8), the base station apparatus transmits an HARQ indicator channel or an UL scheduling grant based on the decoding result.

More specifically, when the decoding result of the uplink shared signal is OK, the base station apparatus transmits an HARQ indicator channel indicating ACK.

Alternatively, when new data to be transmitted are stored in the transmission buffer of the user equipment terminal, the base station apparatus may transmit a new uplink scheduling grant instructing the user equipment terminal to transmit an uplink shared signal.

According to the HARQ control for uplink in the LTE system, the ACK may not necessarily mean that the uplink shared signal has been successfully received. Rather, the ACK may be interpreted that the retransmission of the uplink shared signal may be reserved at the immediately subsequent retransmission timing. Thus, when a user equipment terminal receives the ACK, the user equipment terminal reserves the retransmission of the uplink shared signal. Even if the user equipment terminal receives the ACK, the user equipment terminal does not delete the uplink shared signal from the transmission buffer. When the user equipment terminal is instructed via an UL scheduling grant to retransmit the uplink shared signal at the subsequent HARQ retransmission timing, the user equipment terminal retransmits the uplink shared signal. If the number of retransmissions of the uplink shared signal exceeds the maximum number of retransmissions or if the user equipment terminal is instructed to transmit a new uplink shared signal in the HARQ process of the uplink shared signal, the user equipment terminal deletes the uplink shared signal from the transmission buffer.

When the decoding result of the uplink shared signal is NG, the base station apparatus transmits either an HARQ indicator channel indicating NACK or an UL scheduling grant instructing the user equipment terminal to retransmit the uplink shared signal.

At 206 (in the subframe #i+8), when NACK is transmitted via the HARQ indicator channel or when an uplink scheduling grant instructing the user equipment terminal to retransmit the uplink shared signal is transmitted, the user equipment terminal retransmit the uplink shared signal at 208 (in a subframe #i+12).

At 206 (in the subframe #i+8), when ACK is transmitted via the HARQ indicator channel or when an uplink scheduling grant instructing the user equipment terminal to transmit a new uplink shared signal is transmitted, the uplink shared signal which has been transmitted at 204 is not be retransmitted in the subframe #i+12.

[Non-patent document 1] 3GPP TR 25.814 (V7.0.0), "Physical Layer Aspects for Evolved UTRA", June 2006

[Non-patent document 2] 3GPP TS 36.211 (V8.1.0), "Physical Channels and Modulation", November 2007

[Non-patent document 3] 3GPP TS 36.300 (V8.2.0), "E-UTRA and E-UTRAN Overall description", September 2007

[Non-patent document 4] 3GPP TS 36.321 (V8.1.0), "E-UTRA Medium Access Control (MAC) protocol specification", March 2008

DISCLOSURE OF INVENTION

Problem(s) to be Solved by the Invention

As described above, HARQ control is employed in the PUSCH (Physical Uplink Shared Channel) and acknowledgement information, that is, an HARQ indicator indicating whether the retransmission is needed is transmitted in downlink.

In a typical mobile communication system, an error may occur in transmitted information due to noise or fading. An HARQ indicator transmitted as ACK by the base station apparatus may be received as NACK by the user equipment terminal (ACK-to-NACK error). Similarly, an HARQ indicator transmitted as NACK by the base station apparatus may be received as ACK by the user equipment terminal (NACK-to-ACK error).

In the case of the ACK-to-NACK error, the user equipment terminal retransmits the uplink shared signal. On the other hand, the base station apparatus, which has transmitted ACK, considers that the uplink shared signal is not transmitted and performs assignment for the uplink shared channel. Thus, the base station apparatus may assign to another user equipment terminal the radio resource assigned to the uplink shared signal. In this case, the retransmission of the uplink shared signal may conflict with the transmission of the uplink shared signal transmitted from the other user equipment terminal. As a result, transmission properties (quality) of both the retransmission of the uplink shared signal and the transmission of the uplink shared signal transmitted from the other user equipment terminal may be degraded.

In the case of the NACK-to-ACK error, the user equipment terminal reserves the retransmission of the uplink shared signal as described above. The base station apparatus can determine whether the user equipment terminal actually retransmits the uplink shared signal based on reception quality of the uplink shared signal to be retransmitted. Thus, the base station apparatus can instruct the user equipment terminal to retransmit the uplink shared signal at the subsequent HARQ retransmission timing. In this case, a resource for the HARQ transmission is wasted. Contrary to the case of the ACK-to-NACK error, the retransmission of the uplink shared signal does not conflict with the transmission of the uplink shared signal transmitted from the other user equipment terminal, which has little effect on the transmission properties.

For this reason, a required error rate (quality target) of the ACK-to-NACK error is different from that of the NACK-to-ACK error.

However, binary information representing ACK or NACK in the HARQ indicator is expressed as a signal of "+1" or "−1" and a receiver determines whether information is ACK or NACK based on whether the sign (code) of the received signal is "+" or "−". Assuming that quality of the received signal is constant, the probability of occurrence of the ACK-to-NACK error is the same as that of the NACK-to-ACK error.

In other words, there is a problem in that the HARQ indicator channel cannot be normally decoded while different quality targets are satisfied for the ACK-to-NACK error and the NACK-to-ACK error.

In view of this problem, it is a general object of the present invention to provide a user equipment terminal and a communication control method which achieve decoding so that different quality targets can be satisfied for the ACK-to-NACK error and the NACK-to-ACK error in the HARQ indicator channel.

Means for Solving the Problem(s)

In one aspect of the present invention, there is provided a user equipment terminal for communicating with a base station apparatus using HARQ for uplink, including:

a transmission unit configured to transmit an uplink signal to the base station apparatus;

a reception unit configured to receive a control signal indicating whether the uplink signal is to be retransmitted; and a decoding unit configured to consider the control signal as ACK when signal reliability of the control signal is low, and determine whether the control signal indicates ACK or NACK based on information in the control signal when the signal reliability of the control signal is high.

In another aspect of the present invention, there is provided a communication control method in a user equipment terminal for communicating with a base station apparatus using HARQ for uplink, including the steps of:

transmitting an uplink signal to the base station apparatus;

receiving a control signal indicating whether the uplink signal is to be retransmitted; and considering the control signal as ACK when signal reliability of the control signal is low, and determining whether the control signal indicates ACK or NACK based on information in the control signal when the signal reliability of the control signal is high.

Advantageous Effect of the Invention

According to an embodiment of the present invention, it is possible to achieve decoding so that different quality targets can be satisfied for the ACK-to-NACK error and the NACK-to-ACK error in the HARQ indicator channel.

BRIEF DESCRIPTION OF THE DRAWINGS

FIG. 8 schematically illustrates noise power according to an embodiment of the present invention.

FIG. 9A schematically illustrates an ACK/NACK determining method according to an embodiment of the present invention.

FIG. 9B schematically illustrates an ACK/NACK determining method according to an embodiment of the present invention.

FIG. 9C schematically illustrates an ACK/NACK determining method according to an embodiment of the present invention.

FIG. 10 schematically illustrates an ACK/NACK determining method according a related art.

DETAILED DESCRIPTION OF THE PREFERRED EMBODIMENTS

Figure 1:
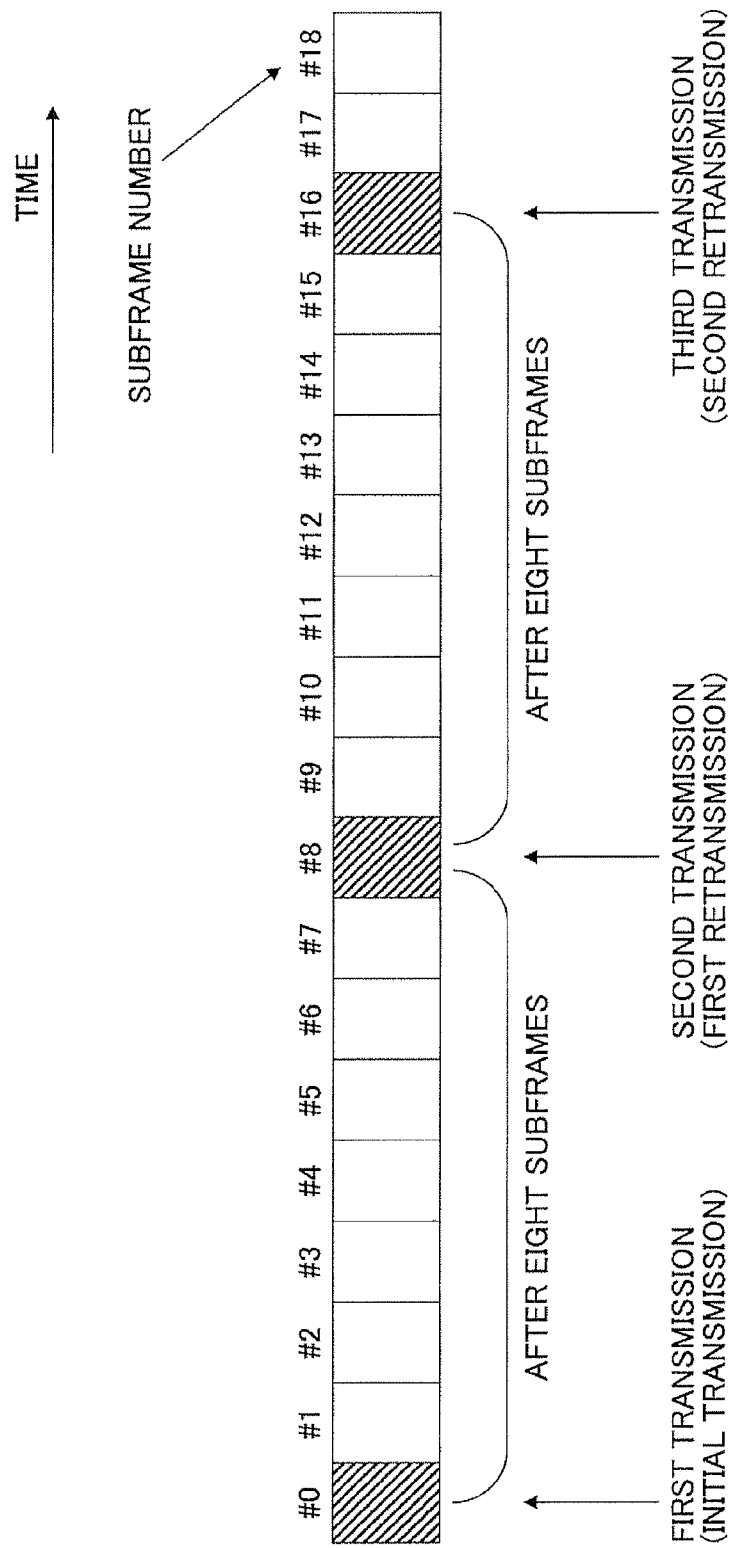
FIG. 1 schematically illustrates retransmissions of an uplink shared signal in an LTE mobile communication system.

According to an embodiment of the present invention, when an HARQ indicator channel (PHICH) is decoded, ACK or NACK is determined based on both reliability of the received signal in the HARQ indicator channel (PHICH) and the sign (code) of the received signal. Consequently, it is possible to achieve decoding so that different quality targets can be satisfied for the ACK-to-NACK error and the NACK-to-ACK error.

Next, a best mode for carrying out the present invention is described based on embodiments described below with reference to the accompanying drawings. Throughout the figures for illustrating the embodiments of the present invention, the same reference numerals are used for the same or equivalent elements and their repeated descriptions may be omitted.

[System]

Figure 3:
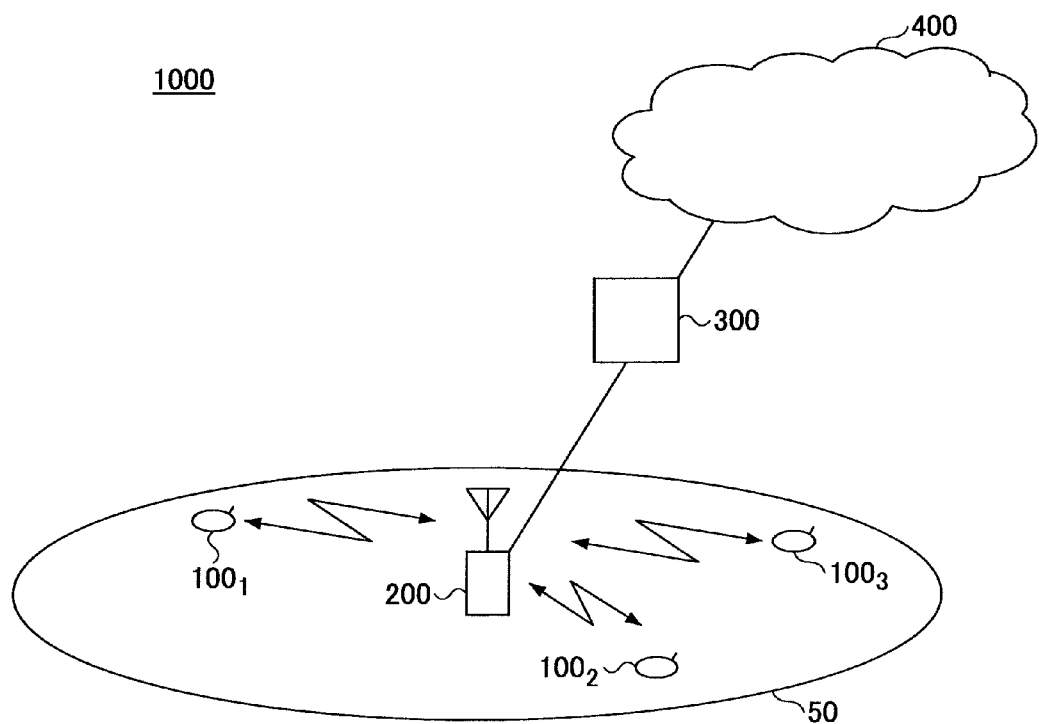
FIG. 3 illustrates a conceptual diagram of a radio communication system according to an embodiment of the present invention.

FIG. 3 illustrates a radio communication system 1000 using a base station apparatus according to one embodiment of the present invention. The radio communication system 1000 is an Evolved UTRA and UTRAN (alternatively referred to as LTE (Long Term Evolution) or Super 3G) applied system, for example. The system includes a base station apparatus (eNB: eNode B) 200 and multiple user equipment (UE) terminals $100_n$ ($100_1$, $100_2$, $100_3$, . . . ; $100_n$ where n is a positive integer). The base station apparatus 200 is connected to an upper node such as an access gateway apparatus 300, and the access gateway apparatus 300 is connected to a core network 400. The user equipment terminals $100_n$ communicate with the base station apparatus 200 in a cell 50 in accordance with Evolved UTRA and UTRAN. The access gateway apparatus 300 may be referred to as an MME/SGW (Mobility Management Entity/Serving Gateway).

The user equipment terminals $100_1$, $100_2$, $100_3$, . . . , $100_n$ have the same arrangement, function and state, and thus the user equipment terminal $100_n$ is described below unless specifically stated otherwise. For convenience, the user equipment terminals wirelessly communicate with the base station apparatus, but more generally, the user equipment terminals include mobile terminals and fixed terminals.

In the radio communication system 100, OFDM (Orthogonal Frequency Division Multiple Access) and SC-FDMA (Single Carrier-Frequency Division Multiple Access) schemes are applied to downlink and uplink, respectively, as radio access schemes. As mentioned above, the OFDM scheme is a multi-carrier transmission scheme where a frequency band is segmented into several narrower frequency bands (subcarriers) and data are mapped into the individual subcarriers. The SC-FDMA scheme is a single-carrier transmission scheme where a frequency band is segmented for different terminals and the multiple terminals use different frequency bands for reduction in inter-terminal interference.

[Communication Channel]

Next, various communication channels for use in the system are described. For downlink, a PDSCH (Physical Downlink Shared Channel) shared among the user equipment terminals $100_n$ and a PDCCH (Physical Downlink Control Channel) are used. The PDCCH may be also referred to as a downlink L1/L2 control channel. Also, information mapped into the PDCCH may be referred to as downlink control information (DCI).

User data (normal data signals) are transmitted in the PDSCH. A transport channel mapped into the PDSCH is a DL-SCH (Downlink Shared Channel). Also, a downlink/uplink scheduling grant, a transmission power control command bit, and so on are transmitted in the PDCCH.

For example, the downlink scheduling grant (DL scheduling grant) includes an ID of a user communicating over the PDSCH, transport format information of the user data, that is, information about a data size, a modulation scheme, and HARQ, assignment information of downlink resource blocks, and so on.

For example, the uplink scheduling grant (UL scheduling grant) includes an ID of a user communicating over a PUSCH (Physical Uplink Shared Channel), transport format information of the user data, that is, information about a data size and a modulation scheme, assignment information of uplink resource blocks, information about transmission power for an uplink shared channel, and so on. The uplink resource block may correspond to a frequency resource and be referred to as a resource unit. In this embodiment, the UL scheduling grant is not only for permitting the uplink shared channel to be transmitted but also for determining whether the permitted transmission corresponds to retransmission. There are various ways to determine whether the transmission corresponds to retransmission. For example, identification information or an indicator may be included in the UL scheduling grant for indicating whether the transmission corresponds to retransmission.

OFDM symbols into which the PDCCH is mapped include a PCFICH (Physical Control Format Indicator Channel) and/or a PHICH (Physical HARQ Indicator Channel). In other words, the PDCCH, the PCFICH, and the PHICH are multiplexed and transmitted in less than or equal to a predefined number of OFDM symbols.

The PCFICH is a channel for indicating to the user equipment terminal the number of OFDM symbols into which the PDCCH is mapped.

The PHICH is a channel for transmitting acknowledgement information for the PUSCH. The acknowledgement information is represented as ACK indicating a positive response or NACK indicating a negative response.

In addition to or instead of the general meaning of the ACK being the positive response, the ACK mapped into the PHICH may be interpreted as refraining from retransmission at the immediately subsequent retransmission timing without reception of an UL scheduling grant. Alternatively, the ACK may be interpreted as reserving the retransmission. The temporal relationship between the transmission timing and the retransmission timing of a certain packet is fixed beforehand according to synchronous HARQ. In this definition, if a user equipment terminal has not received the UL scheduling grant upon receiving the ACK via the PHICH, the user equipment terminal does not retransmit the PUSCH at the immediately subsequent retransmission timing. At a subsequent retransmittable timing, however, if the user equipment terminal receives the UL scheduling grant and is instructed to retransmit the PUSCH, the user equipment terminal retransmits the PUSCH as instructed. In this case, the ACK may not necessarily mean that the PUSCH has been successfully received. The ACK only means that the retransmission of the PUSCH may be reserved at the immediately subsequent retransmission timing. At a subsequent retransmittable timing, if an UL scheduling grant indicating retransmission is received, the retransmission is initiated. Thus, even if the user equipment terminal receives the above-defined ACK, the user equipment terminal must not discard the transmitted PUSCH and has to store it in a retransmission buffer. In this case, if the user equipment terminal is instructed to initiate a new transmission in a HARQ process where the ACK has been received from a base station apparatus or if the number of retransmissions of the PUSCH exceeds the maximum number of retransmissions, the user equipment terminal discards the transmitted PUSCH.

In the above-mentioned example, the PHICH and the PCFICH are defined as channels having the relationship parallel to the PDCCH. However, the PHICH and the PCFICH may be defined as information elements included in the PDCCH.

For downlink, a downlink reference signal (DL RS) is transmitted as a pilot signal used in common by user equipment (UE) terminals. The downlink reference signal is used for channel estimation for decoding the PDSCH, the PDCCH, the PCFICH, and/or the PHICH. The downlink reference signal is also used for calculating CQI (Channel Quality Indicator) indicating downlink radio quality information.

For uplink, a PUSCH (Physical Uplink Shared Channel) shared among the user equipment terminals $100_n$ and a LTE uplink control channel are used. For the LTE uplink control channel, there are two types of channels, that is, a channel transmitted as a portion of the PUSCH and a frequency multiplexed channel. The frequency multiplexed channel is referred to as a PUCCH (Physical Uplink Control Channel). User data (normal data signals) are transmitted in the PUSCH. A transport channel mapped into the PUSCH is an UL-SCH (Uplink Shared Channel). Also, downlink quality information (CQI) used for scheduling operations for the PDSCH and AMCS (Adaptive Modulation and Coding Scheme) as well as acknowledgement information for the PDSCH are transmitted in the LTE uplink control channel. The acknowledgement information is represented as either a positive response (ACK) or a negative response (NACK).

In addition to the CQI and the acknowledgement information, a scheduling request for requesting resource assignment for an uplink shared channel and so on may be transmitted in the LTE uplink control channel. The resource assignment for the uplink shared channel means that a base station apparatus uses a physical downlink control channel for a certain subframe, that is, an UL scheduling grant, to indicate to a user equipment terminal that the user equipment terminal may communicate using the uplink shared channel in a subsequent subframe.

[Subframe Arrangement]

Figure 2:
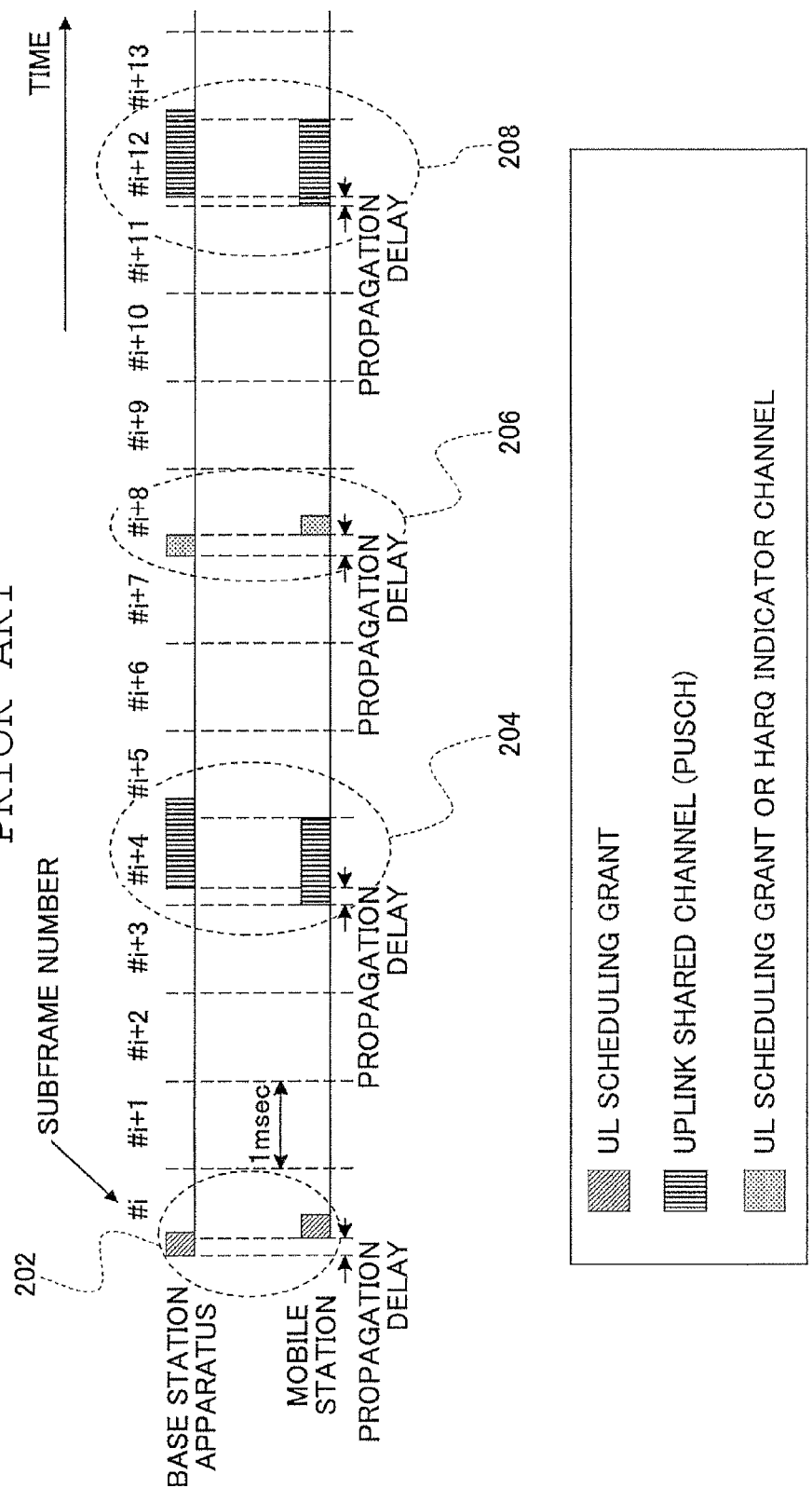
FIG. 2 schematically illustrates HARQ retransmission control in an LTE mobile communication system.
Figure 4:
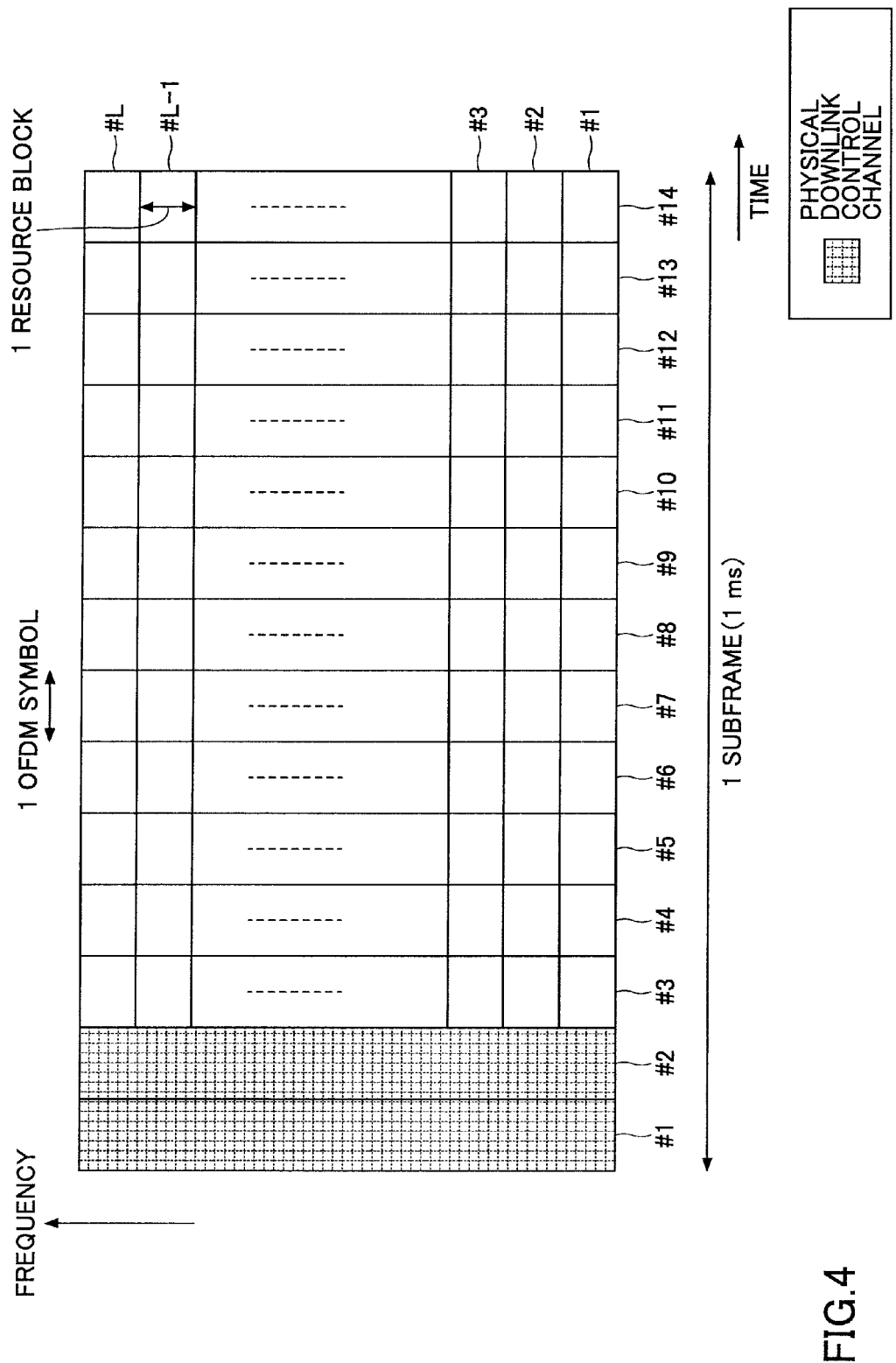
FIG. 4 schematically illustrates a subframe arrangement.

FIG. 4 illustrates an exemplary subframe arrangement. In downlink transmission, one subframe consists of 1 ms, for example, and includes fourteen OFDM symbols. One subframe may be referred to as one TTI (Time Transmission Interval). In FIG. 2, the numbers (#1, #2, #3, . . . , #14) in the time axial direction are for identifying the OFDM symbols, and the numbers (#1, #2, #3, . . . , #L-1, #L; where L is an positive integer) in the frequency axial direction are for identifying resource blocks.

The PDCCH and so on are mapped into the first M OFDM symbols in a subframe. The value of M may be "1", "2", or "3". In FIG. 4, the PDCCH is mapped into the first two OFDM symbols in one subframe, that is, OFDM symbols #1 and #2 (M=2). Then, user data, a synchronization channel (SCH) (also referred to as a synchronization signal), a physical broadcast channel (BCH) and/or a persistent scheduling applied data channel are mapped into OFDM symbols other than the OFDM symbols into which the PDCCH is mapped. It should be noted that the user data correspond to IP packets for web browsing, file transfer (FTP), VoIP, and so on and/or control signals for radio resource control (RRC), for example. The user data is mapped into a PDSCH as a physical channel and as a DL-SCH as a transport channel.

Also, in the frequency direction, L resource blocks are provided in a system band. A frequency band per one resource block may be set to 180 kHz, for example, and the single resource block includes twelve subcarriers, for example. In addition, the total number L of resource blocks may be set to 25 if the system bandwidth is equal to 5 MHz, 50 if the system bandwidth is equal to 10 MHz, 100 if the system bandwidth is equal to 20 MHz, and so on.

[Resource Assignment]

Exemplary resource assignment within the first M OFDM symbols in one subframe is described below. For convenience, a physical resource identified by one subcarrier and one OFDM symbol is referred to as one resource element (RE).

Figure 5:
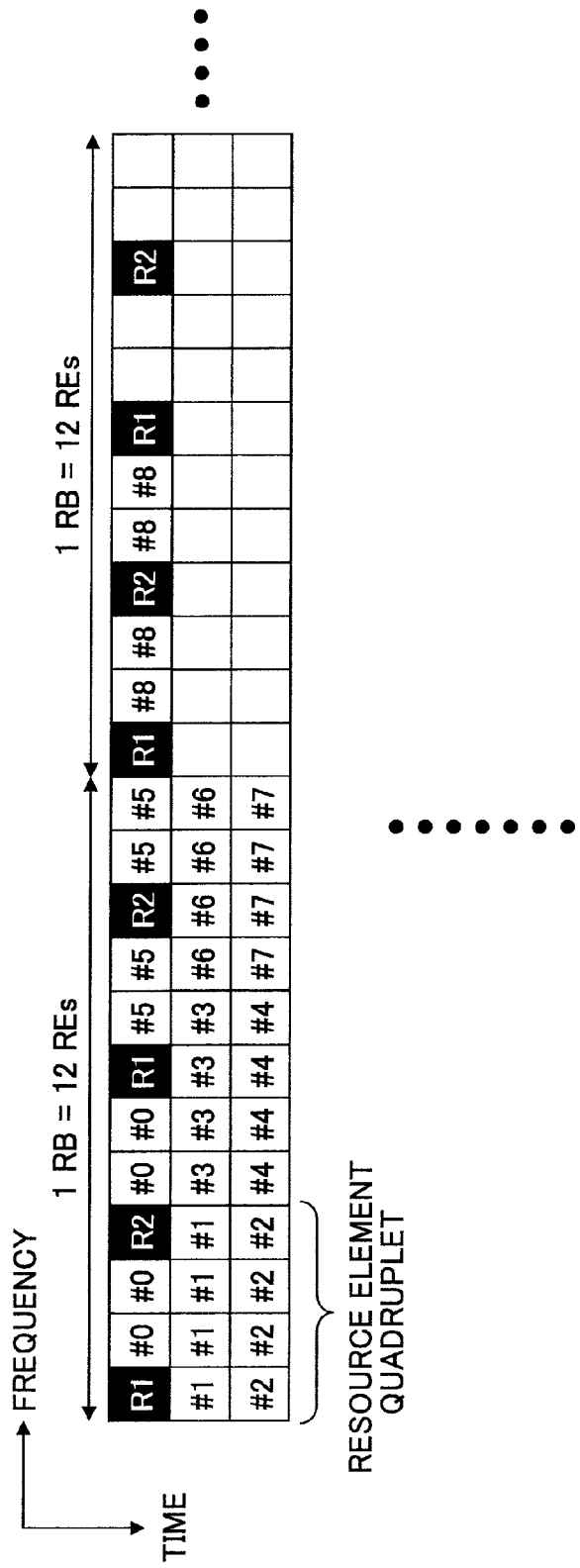
FIG. 5 schematically illustrates exemplary subcarrier mapping.

FIG. 5 illustrates a situation where the PDCCH and so on are mapped into the first three OFDM symbols in a subframe (M=3). Among resources in these M OFDM symbols, the PDCCH, the PCFICH, the PHICH, and so on are mapped into resources other than resources for downlink reference signals. The resources available for the mapping of the PDCCH and so on are segmented for each four consecutive resource elements in the frequency direction except for the reference signals. The resources corresponding to the segmented four resource elements are referred to as a resource element quadruplet. Alternatively, the resources corresponding to the segmented four resource elements may be referred to as a resource element group. The resources are assigned to the PDCCH, the PCFICH, the PHICH, and so on by applying the resource element quadruplet as one minimum unit. The resource element quadruplets are numbered first in the time direction and then in the frequency direction. For example, assuming that there are 25 resource blocks and 12 subcarriers exist for each resource block in the system bandwidth of 5 MHz, there are 300 subcarriers for each OFDM symbol. In the illustrated example, eight resource element quadruplets exist for each resource block (M=3). In this case, 25*8=200 resource element quadruplets exist in the whole 25 resource blocks.

Under the assumption that a downlink reference signal is transmitted from the second antenna even in single antenna transmission, the resource element quadruplets are defined. In the illustrated example, reference signals R1 and R2 are transmitted from the first and second antennas, respectively. In this case, the resource element quadruplets are defined under the assumption that the transmission from the second antenna is actually made regardless of whether the transmission is actually made.

The present invention relates to a PHICH receiving method or decoding method, and thus a PHICH mapping method is described in detail below.

Figure 6:
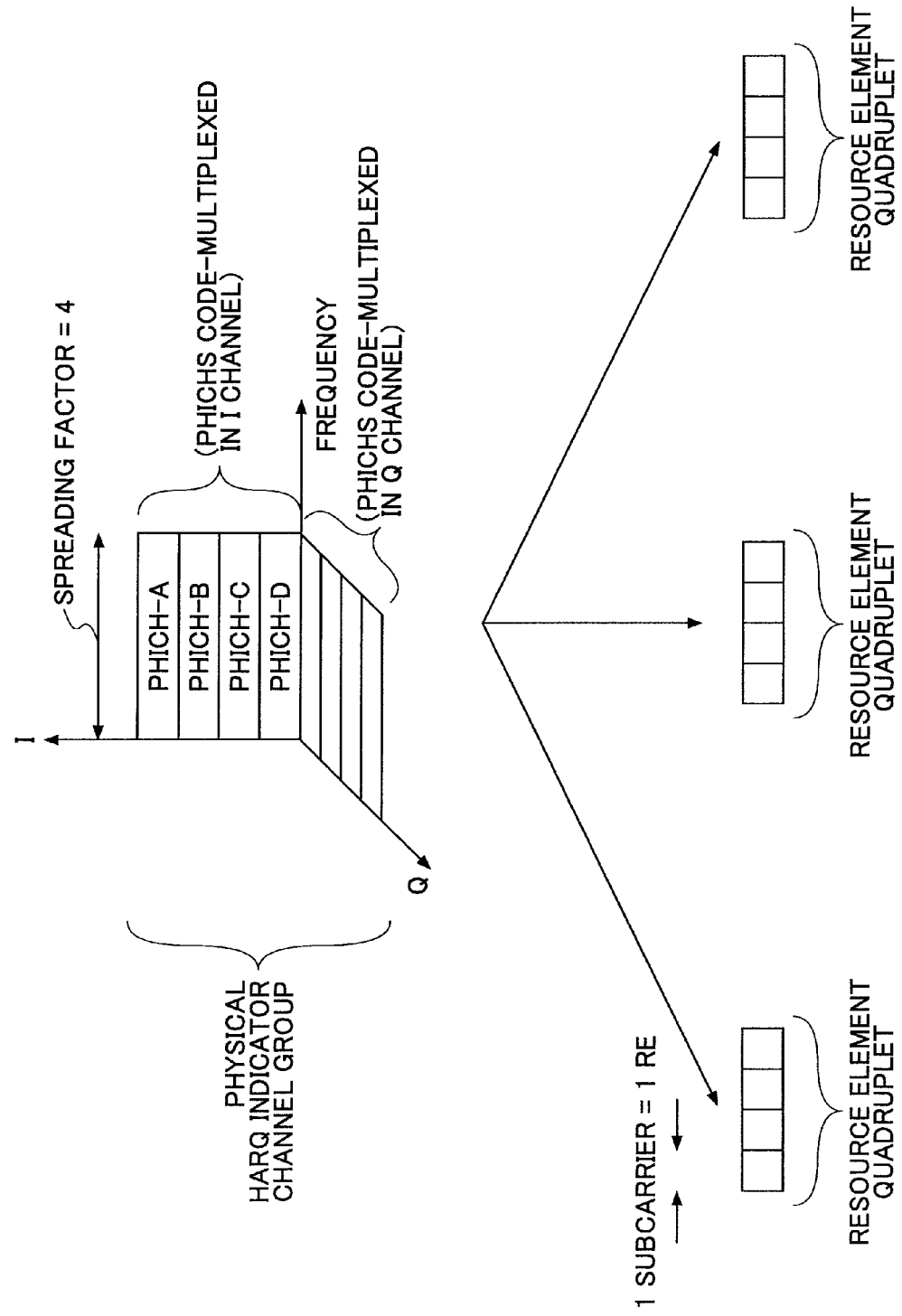
FIG. 6 schematically illustrates a PHICH (ACK/NACK) mapping method.

FIG. 6 illustrates a situation where the PHICH is mapped. The PHICH is mapped into a physical HARQ indicator channel group consisting of three resource element quadruplets. More specifically, the PHICH is code-multiplexed (CDMA) into twelve resource elements corresponding to three resource element quadruplets using the spreading factor of 4, I/Q multiplexed, and then mapped. In other words, eight PHICHs are multiplexed into one physical HARQ indicator channel group. Four of the PHICHs are code-multiplexed in I component side, and four of the PHICHs are code-multiplexed in Q component side. These eight PHICHs are mapped into twelve resource elements. As stated above, the resource element corresponds to a resource identified by one OFDM symbol and one subcarrier. The above-mentioned three resource element quadruplets may be adjacent or distributed within a system band. One or more of the above-mentioned physical HARQ indicator channel group may be provided within one subframe.

Also, numbers are attached to the different PHICHs and each of the numbers corresponds to the smallest number of resource blocks (RBs) into which the PUSCH is mapped. For example, it is assumed that numbers are sequentially attached to resource blocks within a system band from the lower frequency side. (If the system bandwidth is equal to 5 MHz, first through twenty-fifth resource block numbers are present.) If the base station apparatus 200 receives the PUSCH mapped into fourth through eighth resource block numbers, the base station apparatus 200 uses fourth PHICH to transmit the PHICH corresponding to the PUSCH. By predefining the correspondence between resource block numbers used for the PUSCH and PHICH mapping positions, the PHICH mapping positions do not have to explicitly signaled to a user equipment terminal for every time.

It should be noted that the above-mentioned resource assignment to the PDCCH, the PCFICH and PHICH is simply illustrative and the resource assignment may be carried out in any other manner. For example, the resource assignment may be based on code multiplexing, frequency multiplexing, or time multiplexing. Alternatively, a combination of at least two of the code multiplexing, the frequency multiplexing, and the time multiplexing may be applied.

In FIGS. 5 and 6, the case where the number of OFDM symbols into which the PDCCH is mapped is equal to three has been intensively described. However, the above-mentioned resource assignment method and the mapping method may be similarly applied to the case where the number of OFDM symbols into which the PDCCH is mapped is equal to one or two.

[User Equipment Terminal—UE]

Figure 7:
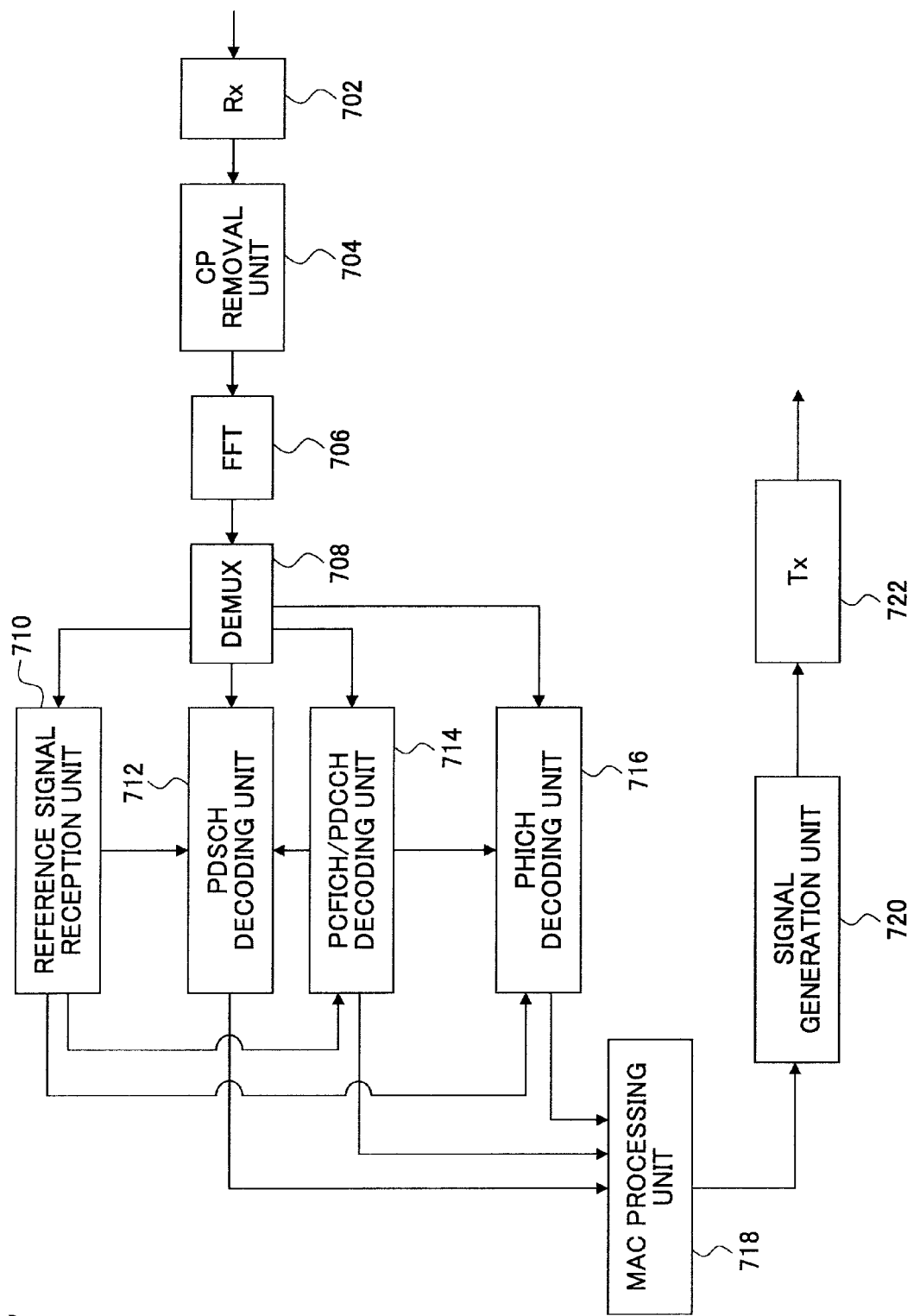
FIG. 7 illustrates a partial block diagram of a user equipment terminal according to an embodiment of the present invention.

Referring to FIG. 7, a user equipment terminal $100_n$ according to one embodiment of the present invention is described. In FIG. 7, a reception unit (Rx) 702, a CP removal unit 704, a fast Fourier transform unit (FFT) 706, a demultiplexing unit (DEMUX) 708, a reference signal reception unit 710, a PDSCH decoding unit 712, a PCFICH/PDCCH decoding unit 714, a PHICH decoding unit 716, a MAC processing unit 718, a signal generation unit 720, and a transmission unit (Tx) 722 are illustrated.

The reception unit (Rx) 702 receives a downlink signal and performs power amplification, frequency conversion, band limiting, analog-to-digital conversion, and so on to derive a received baseband signal.

The CP removal unit 704 removes a signal portion corresponding to a guard interval from the received signal. The guard interval may be also referred to as a cyclic prefix (CP).

The fast Fourier transform unit (FFT) 706 performs fast Fourier transform of an incoming signal to convert a time domain signal into a frequency domain signal.

The demultiplexing unit (DEMUX) 708 extracts various signals mapped into different subcarriers. Although the received signal includes various communication channels as described above, the PCFICH, the PDCCH, the PHICH, the PDSCH, and the downlink reference signal (DL RS) are particularly important in this embodiment. For simplified illustration, other potentially received channels are omitted in FIG. 7. The demultiplexing unit (DEMUX) 708 supplies the extracted downlink reference signal (DL RS) to the reference signal reception unit 710, the extracted PDSCH to the PDSCH decoding unit 712, the extracted PDCCH and PCFICH to the PCFICH/PDCCH decoding unit 714, and the extracted PHICH to the PHICH decoding unit 716.

The reference signal decoding unit 710 performs channel estimation based on the supplied downlink reference signal (DL RS) and determines channel compensation to be applied to the received data signal, that is, the PCFICH, the PDCCH, the PHICH, and/or the PDSCH. In this manner, the reference signal decoding unit 710 calculates a channel estimation value. The reference signal decoding unit 710 supplies the calculated channel estimation value to the PDSCH decoding unit 712, the PCFICH/PDSCH decoding unit 714, and the PHICH decoding unit 716.

The PDSCH decoding unit 712 receives the channel estimation result from the reference signal reception unit 710. The PDSCH decoding unit 712 also receives the number of OFDM symbols into which the PDCCH is mapped in the subframe and information about a transmission format of the PDSCH to be received in the subframe. The information about the transmission format of the PDSCH to be received in the subframe means information transmitted via a DL scheduling grant. Then, the PDSCH decoding unit 712 restores the PDSCH signal transmitted from the base station apparatus 200 based on the channel estimation result, the number of OFDM symbols into which the PDCCH is mapped in the subframe, and the information about the transmission format of the PDSCH to be received in the subframe. The PDSCH decoding unit 712 supplies the restored PDSCH signal to the MAC processing unit 718.

The PCFICH/PDCCH decoding unit 714 receives the channel estimation result from the reference signal reception unit 710. The PCFICH/PDCCH decoding unit 714 restores the PCFICH transmitted from the base station apparatus 200 based on the channel estimation result. Then, the PCFICH/PDCCH decoding unit 714 acquires information about the number of OFDM symbols into which the PDCCH is mapped in the subframe. The information about the number of OFDM symbols into which the PDCCH is mapped in the subframe is supplied to the PDSCH decoding unit 712 and the PHICH decoding unit 716. The PCFICH/PDCCH decoding unit 714 also restores the PDCCH transmitted from the base station apparatus 200 based on the channel estimation result and the number of OFDM symbols into which the PDCCH is mapped in the subframe. The PCFICH/PDCCH decoding unit 714 supplies the restored PDCCH signals to the MAC processing unit 718. Among the decoded PDCCH signals, the PCFICH/PDCCH decoding unit 714 also supplies to the PDSCH decoding unit 712 the PDCCH signal into which the DL scheduling grant is mapped.

The PHICH decoding unit 716 receives the channel estimation result from the reference signal reception unit 710. The PHICH decoding unit 716 also receives from the PCFICH/PDCCH decoding unit 714 the number of OFDM symbols into which the PDCCH is mapped in the subframe. Then, the PHICH decoding unit 716 restores the PHICH signal transmitted form the base station apparatus 200 based on the channel estimation result and the number of OFDM symbols into which the PDCCH is mapped in the subframe and acquires information in an HARQ indicator mapped into the PHICH. In this manner, the PHICH decoding unit 716 determines whether the information in the HARQ indicator mapped to the PHICH is ACK or NACK.

A method of determining whether the information in the HARQ indicator mapped to the PHICH is ACK or NACK is described in detail below.

The PHICH decoding unit 716 acquires information about a resource element into which the PHICH for the user equipment terminal $100_n$ is mapped based on the number of OFDM symbols into which the PDCCH is mapped in the subframe, and then extracts the PHICH signal for the user equipment terminal $100_n$ in the subframe. Then, the PHICH decoding unit 716 makes compensation for the extracted PHICH signal based on the channel estimation result and performs I/Q demapping and despreading to restore the PHICH signal. It should be noted that the DEMUX 708 may extract the PHICH signal for the user equipment terminal $100_n$ in the subframe.

The PHICH decoding unit 716 calculates reliability of the PHICH signal based on the restored PHICH signal. For example, the PHICH decoding unit 716 may calculate, as the reliability of the PHICH signal, the following SIR:

$$SIR = S/I$$

where I is noise power and S is signal power of the PHICH signal. The SIR is also referred to as a signal-to-interference ratio and is an indicator of signal reception quality. For example, the noise power I may be calculated based on variance of the received downlink reference signals (DL RSs). For example, as shown in FIG. 8, the noise power I may be an average of the square of vector differences between a reference signal vector $\vec{S}_{ref}$ and received signal vectors $\vec{S}_i$ (where i=1, 2, ..., N) of the downlink reference signals. In other words, I may be calculated as follows.

$$I = \frac{\sum_{i=1}^{N} |\vec{S}_i - \vec{S}_{ref}|^2}{N}$$

For example, the reference signal vector may be an average of the received signal vectors $\vec{S}_i$ (where i=1, 2, ..., N) of the downlink reference signals. Alternatively, the reference signal vector may be any other predetermined reference vector.

The received signal vectors of the downlink reference signals may be received signal vectors after or before compensation is made based on the channel estimation.

Also, downlink reference signals within the whole system band may be used for the calculation of the noise power I. Alternatively, downlink reference signals within a frequency band into which the PHICH is mapped may be used for the calculation of the noise power I. Alternatively, downlink reference signals within any other predetermined frequency band may be used for the calculation of the noise power I.

Also, the noise power I may be an instantaneous value in the subframe or an averaged value in the time direction.

Instead of using the downlink reference signals for the calculation of the noise power I, the noise power I may be calculated using the PHICH signal. In other words, the noise power I may be calculated based on variance of the received PHICH signals.

It should be noted that the calculation of the noise power I is not limited to these approaches. Alternatively, the noise power I may be calculated using any other approach with which the noise power can be correctly estimated.

Also, the signal power S of the PHICH signal may be calculated based on the square of received signal vectors of PHICH signals. The PHICH signals may be CDMA-spread signals or signals prior to spreading by despreading the CDMA-spread signals. Alternatively, the PHICH signals may be signals before or after compensation is made based on the channel estimation value.

In the above-mentioned example, SIR is calculated as reliability of the PHICH signal. Alternatively, any other indicator may be used to estimate the reliability of the PHICH signal. For example, the signal power S of the PHICH signal may be used as the reliability of the PHICH signal. Alternatively, normalized signal power S of the PHICH signal may be used as the reliability of the PHICH signal. For example, the normalized signal power S of the PHICH signal may be the signal power S of the PHICH signal which is normalized using reception power of the DL RS.

Then, the PHICH decoding unit 716 determines whether information in the HARQ indicator mapped to the PHICH is ACK or NACK based on the SIR, a predetermined threshold, and the sign of the restored PHICH signal.

One example of determining whether the information in the HARQ indicator mapped to the PHICH is ACK or NACK is described in detail below, assuming that the ACK is defined as "+1" and the NACK is defined as "−1", for example.

First, the PHICH decoding unit 716 determines whether the SIR is below the predetermined threshold.

If the SIR is below the predetermined threshold, the information in the HARQ indicator mapped to the PHICH is considered (interpreted) as ACK.

More specifically, assuming that the predetermined threshold is set to 3 dB, if the SIR is 2 dB, the information in the HARQ indicator mapped to the PHICH is considered as ACK.

Also, if the SIR is not below the predetermined threshold, the PHICH decoding unit 716 determines whether the sign of the restored PHICH signal is "+" or "−". If the sign of the restored PHICH signal is "+", the PHICH decoding unit 716 considers the information in the HARQ indicator mapped to the PHICH as ACK. If the sign of the restored PHICH signal is "−", the PHICH decoding unit 716 considers the information in the HARQ indicator mapped to the PHICH as NACK.

More specifically, assuming that the predetermined threshold is set to 3 dB, if the SIR is 5 dB and the sign of the restored PHICH signal is "+", the PHICH decoding unit 716 considers the information in the HARQ indicator mapped to the PHICH as ACK. Assuming that the predetermined threshold is set to 3 dB, if the SIR is 5 dB and the sign of the restored PHICH signal is "−", the PHICH decoding unit 716 considers the information in the HARQ indicator mapped to the PHICH as NACK.

In other words, the PHICH decoding unit 716 considers the information as ACK, if the reliability, that is, the SIR of the PHICH signal is low. The PHICH decoding unit 716 determines whether the information is ACK or NACK based on the sign of the restored PHICH signal, if the reliability, that is, the SIR of the PHICH signal is high.

FIG. 9A schematically illustrates a method of determining whether information in the HARQ indicator channel mapped to the PHICH is ACK or NACK. FIG. 9A also illustrates the effect of a PHICH decoding method according to the present invention. In FIG. 9A, the absolute value in the horizontal axis represents signal reliability (SIR), and the sign ("+" or "−") represents the sign of the PHICH signal. The horizontal axis may be the same as the I axis of the received signal, if the PHICH signal is mapped into the I component. The horizontal axis may be the same as the Q axis of the received signal, if the PHICH signal is mapped into the Q component.

FIG. 9A is simply illustrative and the predetermined threshold may be defined on the IQ plane as shown in FIGS. 9B and 9C. As shown in FIG. 9B, the predetermined threshold may be defined by a straight line. As shown in FIG. 9C, the predetermined threshold may be defined by a curve. In other words, the reliability (SIR) of the PHICH signal may be determined based on a position on the IQ plane. More specifically, the reliability of the PHICH signal may be determined based on the distance from a reliable signal position, that is, based on whether the position of the PHICH signal is close to or far from the reliable signal position. If the position of the PHICH signal is close to the reliable signal position, the reliability of the PHICH signal may be determined to be high. If the position of the PHICH signal is far from the reliable signal position, the reliability of the PHICH signal may be determined to be low.

Typically, an error rate of a signal depends on an average SIR of the signal. For example, assuming that a received signal is decoded as usual based on whether the sign of the received signal is "+" or "−" using Threshold=0, as shown in FIG. 10, if the average SIR is sufficiently high, a signal error does not occur. However, if the average SIR is low, a signal error occurs with a certain probability. Specifically, if the average SIR is low, the signal transmitted as "+" may be received in the region corresponding to "−" or the signal transmitted as "−" may be received in the region corresponding to "+" due to noise. In addition, the lower the average SIR, the higher the probability of the signal error. Also, in FIG. 10, the region where the signal is considered as ACK is symmetrical to the region where the signal is considered as NACK. Thus, in the case of a constant average SIR, the probability that the signal transmitted as "+" is received in the region corresponding to "−", that is, the probability of the ACK-to-NACK error is the same as the probability that the signal transmitted as "−" is received in the region corresponding to "+", that is, the probability of the NACK-to-ACK error.

However, as shown in FIG. 9A, the predetermined threshold is set to a value other than zero (0). The region A is defined where the SIR value is below the predetermined threshold, the region B is defined where the SIR value is above the predetermined threshold and the sign of the PHICH signal is positive, and the region C is defined where the SIR value is above the predetermined threshold and the sign of the PHICH signal is negative. Signals in the regions A and B are considered as ACK, and signals in the region C are considered as NACK. In this case, the region where the signal is considered as ACK is asymmetrical to the region where the signal is considered as NACK. Thus, even in the case of a constant average SIR, the probability that the signal transmitted as "+" is received in the region corresponding to "−", that is, the probability of the ACK-to-NACK error is different from the probability that the signal transmitted as "−" is received in the region corresponding to "+", that is, the probability of the NACK-to-ACK error. More specifically, even in the case of a constant average SIR, the probability of the ACK-to-NACK error is lower than the probability of the NACK-to-ACK error.

Assuming that interference power I is constant, the average SIR is determined based on transmission power in the base station apparatus 200. Thus, even if the transmission power of the PHICH in the base station apparatus 200 is constant, the probability of the ACK-to-NACK error may be different from the NACK-to-ACK error.

With the use of the predetermined threshold, a PHICH signal may be decoded so that the probability of the ACK-to-NACK error is different from the probability of the NACK-to-ACK error, even if received signal quality (average SIR) in the case of ACK is the same as received signal quality (average SIR) in the case of NACK. Alternatively, with the use of the predetermined threshold, a PHICH signal may be decoded so that the probability of the ACK-to-NACK error is different from the probability of the NACK-to-ACK error, even if transmission power of the PHICH in the case of ACK is the same as transmission power of the PHICH in the case of NACK in the base station apparatus 200.

For example, with the use of the predetermined threshold, a PHICH signal may be decoded so that the probability of the ACK-to-NACK error is equal to 0.1% while the probability of the NACK-to-ACK error is equal to 1%, even if received signal quality (average SIR) in the case of ACK is the same as received signal quality (average SIR) in the case of NACK. Alternatively, with the use of the predetermined threshold, a PHICH signal may be decoded so that the probability of the ACK-to-NACK error is equal to 0.1% while the probability of the NACK-to-ACK error is equal to 1%, even if transmission power of the PHICH in the case of ACK is the same as transmission power of the PHICH in the case of NACK in the base station apparatus 200.

In the above-mentioned example, a PHICH signal is decoded so that the probability of the ACK-to-NACK error is different from the probability of the NACK-to-ACK error, even if an average SIR or transmission power of the PHICH in the base station apparatus 200 in the case of ACK is the same as that in the case of NACK. Alternatively, a PHICH signal may be decoded so that an average SIR or transmission power of the PHICH in the base station apparatus 200 in the case of ACK is different from that in the case of NACK, if required quality (required error rate or quality target) of the ACK-to-NACK error is the same as that of the NACK-to-ACK error.

More specifically, a PRIOR signal may be decoded so that an average SIR in the case of ACK is 3 dB lower than an average SIR in the case of NACK, if required quality (required error rate or quality target) of both the ACK-to-NACK error and the NACK-to-ACK error is 1%. Alternatively, a PHICH signal may be decoded so that transmission power in the case of ACK is 3 dB less than transmission power in the case of NACK, if required quality (required error rate or quality target) of both the ACK-to-NACK error and the NACK-to-ACK error is 1%.

In the above-mentioned example, the average SIR may be expressed as $I_{or}/I_{oc}$ or $E_s/N_0$. Alternatively, the average SIR may be determined based on $I_{or}/I_{oc}$ or $E_s/N_0$ and transmission power of the PHICH in the base station apparatus 200. It should be noted that the transmission power of the PHICH in the base station apparatus 200 may be an absolute value or a relative value. When the relative value is used, the transmission power value may be defined as a power difference between power of the resource element and average transmission power per one resource element when the base station apparatus 200 transmits the signal with maximum transmission power, for example.

With the increase in the predetermined threshold, the regions A and B become larger and the region C becomes smaller. Accordingly, the probability of the ACK-to-NACK error becomes lower and the probability of the NACK-to-ACK error becomes higher. With the decrease in the predetermined threshold, the regions A and B become smaller and the region C becomes larger. Accordingly, the probability of the ACK-to-NACK error becomes higher and the probability of the NACK-to-ACK error becomes lower. Thus, the PHICH decoding unit 716 can adjust the probability of the ACK-to-NACK error and the probability of the NACK-to-ACK error by adjusting the predetermined threshold. In other words, the predetermined threshold may be determined based on at least one of required quality (quality target) of the ACK-to-NACK error and required quality (quality target) of the NACK-to-ACK error.

More specifically, the predetermined threshold may be determined so that required quality (quality target) of the ACK-to-NACK error is equal to 0.1%. Alternatively, the predetermined threshold may be determined so that required quality (quality target) of the NACK-to-ACK error is equal to 1%.

Alternatively, the predetermined threshold may be determined so that required quality (quality target) of the ACK-to-NACK error is equal to 0.1% while required quality (quality target) of the NACK-to-ACK error is equal to 1%, if received signal quality (average SIR) in the case of ACK is the same as received signal quality (average SIR) in the case of NACK. Alternatively, the predetermined threshold may be determined so that required quality of the ACK-to-NACK error is tenth of required quality of the NACK-to-ACK error, if received signal quality (average SIR) in the case of ACK is the same as received signal quality (average SIR) in the case of NACK.

Alternatively, the predetermined threshold may be determined so that required quality (quality target) of the ACK-to-NACK error is equal to 0.1% while required quality (quality target) of the NACK-to-ACK error is equal to 1%, if transmission power of the PHICH in the base station apparatus 200 in the case of ACK is the same as transmission power of the PHICH in the case of NACK. Alternatively, the predetermined threshold may be determined so that required quality of the ACK-to-NACK error is tenth of required quality of the NACK-to-ACK error, if transmission power of the PHICH in the base station apparatus 200 in the case of ACK is the same as transmission power of the PHICH in the case of NACK.

As described above, a PHICH signal may be decoded so that an average SIR or transmission power of the PHICH in the base station apparatus 200 in the case of ACK is different from that in the case of NACK, if required quality (required error rate or quality target) of the ACK-to-NACK error is the same as that of the NACK-to-ACK error. In this case, the predetermined threshold may be determined as follows.

More specifically, the predetermined threshold may be determined so that an average SIR in the case of ACK is 3 dB lower than an average SIR in the case of NACK, if required quality (required error rate or quality target) of both the ACK-to-NACK error and the NACK-to-ACK error is 1%. Alternatively, the predetermined threshold may be determined so that transmission power of the PHICH in the base station apparatus 200 in the case of ACK is 3 dB less than transmission power of the PHICH in the base station apparatus 200 in the case of NACK, if required quality (required error rate or quality target) of both the ACK-to-NACK error and the NACK-to-ACK error is 1%.

In the above-mentioned example, required quality of the ACK-to-NACK error is higher than that of the NACK-to-ACK error. Alternatively, the decoding method according to this embodiment can be similarly applied to the case where required quality of the NACK-to-ACK error is higher than that of ACK-to-NACK error (where the NACK-to-ACK error rate is lower than the ACK-to-NACK error rate). In this case, the region A shown in FIG. 9 is a region where the signal is considered as NACK.

Then, the PHICH decoding unit 712 supplies to the MAC processing unit 718 the decoded PHICH signal, that is, ACK or NACK as determined above.

The MAC processing unit 718 performs transmission processing in terms of MAC retransmission control for uplink user data, reception processing in terms of retransmission control for downlink user data, and so on.

The MAC processing unit 718 receives the PDSCH signal decoded by the PDSCH decoding unit 712, the PDCCH signal decoded by the PCFICH/PDCCH decoding unit 714, and the PHICH signal decoded by the PHICH decoding unit 716. A downlink scheduling grant and/or an UL scheduling grant are mapped to the PDCCH.

The MAC processing unit 718 determines a transmission format of uplink user data, performs transmission processing in terms of retransmission control (HARQ) in the MAC layer, and so on based on the received UL scheduling grant and the PHICH signal. More specifically, when the user equipment terminal 100$_n$ is instructed by the base station apparatus 200 via the UL scheduling grant supplied by the PCFICH/PD-CCH decoding unit 714 to communicate using the uplink shared channel, the MAC processing unit 718 performs the determination of the transmission format and transmission processing in terms of retransmission control (HARQ) for packet data in the data buffer in the user equipment terminal 100$_n$. Then, the MAC processing unit 718 supplies the packet data to the signal generation unit 720.

For downlink, the MAC processing unit 718 performs reception processing in terms of MAC retransmission control for downlink user data and so on based on the decoded PDSCH signal received from the PDSCH decoding unit 712 and the DL scheduling grant received from the PCFICH/PDCCH decoding unit 714.

In this embodiment, upper-layer processing such as an RLC layer processing or a PDCP layer processing above the MAC layer does not directly relate to the present invention and thus its discussions are omitted.

The signal generation unit 720 generates (for example, performs encoding, data modulation, and so on) signals to be transmitted in uplink such as an uplink shared channel, a sounding RS, and an uplink control channel, for example, downlink quality information (CQI), acknowledgement information of a downlink shared channel, and so on. The generated signals are supplied to the transmission unit 722.

The transmission unit (Tx) 722 performs transmission processing such as DFT processing, IFFT processing, and CP insertion processing. The transmission unit (Tx) 722 also converts baseband transmission symbols into a radio signal. The transmission unit (Tx) 722 also performs known operations such as digital-to-analog conversion, frequency conversion, band limiting and power amplification.

Figure 11:
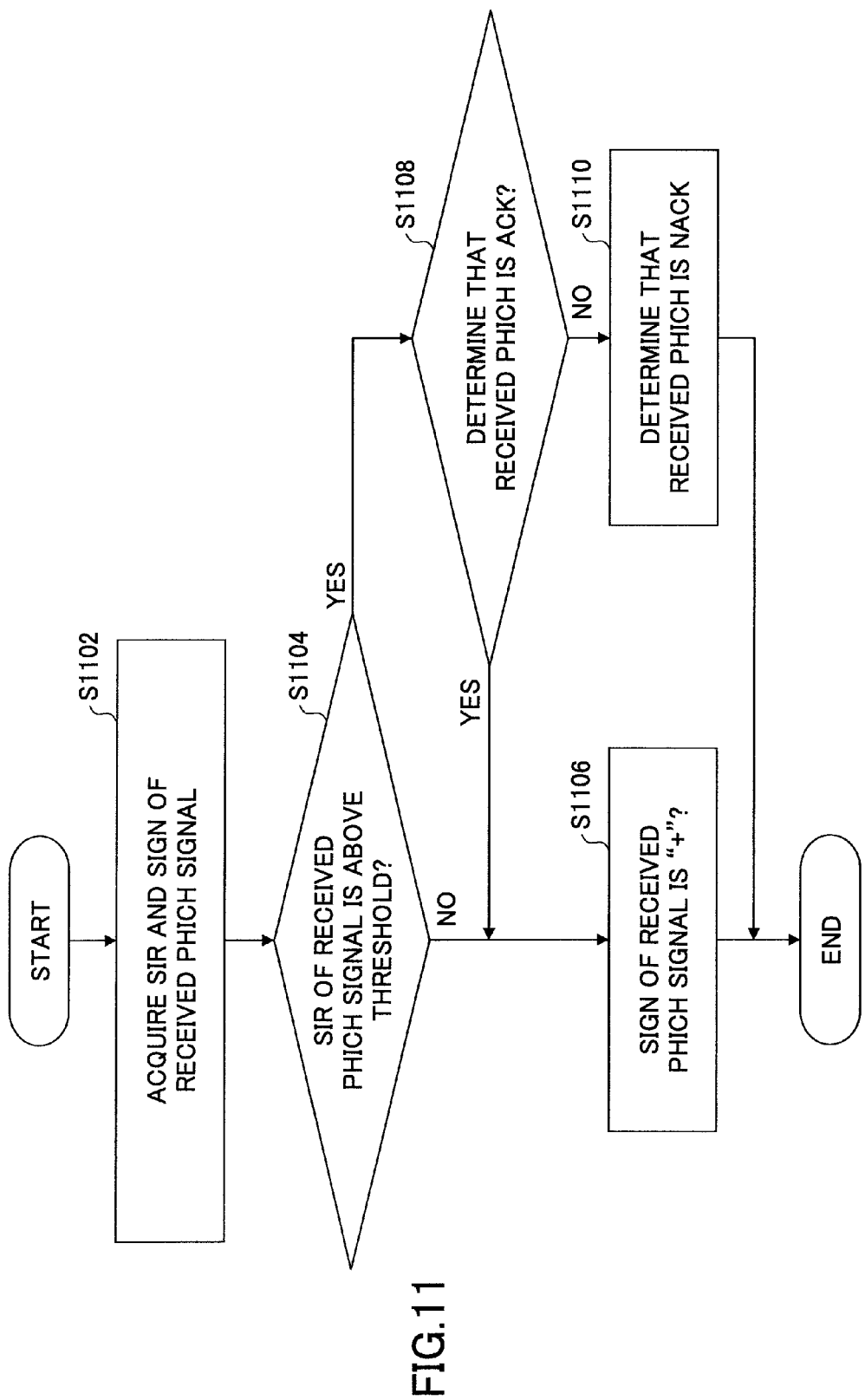
FIG. 11 illustrates a flowchart of an exemplary operation according to an embodiment of the present invention.

Referring to FIG. 11, one example of a PHICH decoding method (communication control method) in the PHICH decoding unit 716 is described below.

[Example of PHICH Decoding Method]

In step S1102, the PHICH decoding unit 716 acquires an SIR and a sign ("+" or "−") of a received PHICH signal.

In step S1104, the PHICH decoding unit 716 determines whether the SIR of the received PHICH signal is above a predetermined threshold.

If the SIR of the received PHICH signal is above the predetermined threshold (step S1104: YES), the method proceeds to step S1108. Otherwise (step S1104: NO), the method proceeds to step S1106.

In step S1106, the PHICH decoding unit 716 determines that the received PHICH is ACK.

In step S1108, the PHICH decoding unit 716 determines whether the sign of the received PHICH signal is "+".

If the sign of the received PHICH signal is "+" (step S1108: YES), the method proceeds to step S1106. Otherwise (step S1108: NO), the method proceeds to step S1110.

In step S1110, the PHICH decoding unit 716 determines that the received PHICH is NACK.

In the above-mentioned example, it is assumed that ACK is expressed as "+1" and NACK is expressed as "−1". Alternatively, the decoding method can be similarly applied to the case where ACK is expressed as "−1" and NACK is expressed as "+1". In this case, the determination of the sign in step S1108 is reversed. More specifically, if the sign of the received PHICH signal is "−" (step S1108: YES), the method proceeds to step S1106. Otherwise (step S1108: NO), the method proceeds to step S1110.

[Industrial Applicability]

In the above-mentioned embodiments, the Evolved UTRA and UTRAN (Long Term Evolution or Super 3G) applied system has been described. However, the user equipment terminal and the communication control method according to the present invention may be applied to any other appropriate system that uses signals corresponding to the PHICH and employs HARQ control. For example, the present invention may be applied to an HSDPA/HSUPA based W-CDMA system, an IMT-Advanced system, a WiMAX system, a Wi-Fi based system, and so on.

The present invention has been described with reference to the specific embodiments, but the embodiments are simply illustrative and variations, modifications, alterations, and substitutions could be recognized by those skilled in the art. In the above-mentioned description, some specific numerical values are used for better understanding of the present invention. Unless specifically indicated, however, these numerical values are simply illustrative and any other suitable values may be used. In order to facilitate better understandings of the present invention, specific formulae have been used for illustration. However, these formulae are simply illustrative, and any other appropriate formula may be used, unless specifically stated otherwise. For convenience of explanation, apparatuses or terminals according to the embodiments of the present invention have been described with reference to functional block diagrams, but these apparatuses or terminals may be implemented in hardware, software, or combinations thereof. The present invention is not limited to the above-mentioned embodiments, and variations, modifications, alterations, and substitutions can be made by those skilled in the art without deviating from the spirit of the present invention.

The present international application claims priority from Japanese Patent Application No. 2008-105062 filed on Apr. 14, 2008, the entire contents of which are hereby incorporated herein by reference.

DESCRIPTION OF NOTATIONS 50 cell
100$_1$, 100$_2$, 100$_3$, 100$_n$ user equipment terminal
200 base station apparatus
300 access gateway apparatus
400 core network
702 reception unit (Rx)
704 CP removal unit
706 fast Fourier transform unit (FFT)
708 demultiplexing unit (DEMUX)
710 reference signal reception unit
712 PDSCH decoding unit
714 PCFICH/PDCCH decoding unit
716 PHICH decoding unit
718 MAC processing unit
720 signal generation unit
722 transmission unit (Tx)

The invention claimed is:

1. A user equipment terminal for communicating with a base station apparatus using HARQ for uplink, comprising:
a transmission unit configured to transmit an uplink signal to the base station apparatus;
a reception unit configured to receive a control signal indicating whether the uplink signal is to be retransmitted;
a decoding unit configured to consider the control signal as ACK when an absolute value of reception quality of the control signal is low, and determine whether the control signal indicates ACK or NACK based on information in the control signal when the absolute value of reception quality of the control signal is high;
wherein when the absolute value of reception quality of the control signal is high, the decoding unit considers the control signal as ACK when a sign of the information in the control signal is "+", and considers the control signal as NACK when the sign of the information in the control signal is "−"; and the decoding unit defines a predetermined threshold, considers the control signal as ACK when the absolute value of reception quality of the control signal is below the predetermined threshold, and determines whether the control signal indicates ACK or NACK based on information in the control signal when the absolute value of reception quality of the control signal is above the predetermined threshold.

2. The user equipment terminal as claimed in claim 1, wherein:

the reception quality of the control signal is a signal-to-interference ratio of the control signal.

3. The user equipment terminal as claimed in claim 1, wherein: the predetermined threshold is defined based on at least one of required quality of an ACK-to-NACK error and required quality of a NACK-to-ACK error.

4. The user equipment terminal as claimed in claim 1, wherein:

the control signal corresponds to a physical HARQ indicator channel.

5. A communication control method in a user equipment terminal for communicating with a base station apparatus using HARQ for uplink, comprising the steps of:

transmitting an uplink signal to the base station apparatus;

receiving a control signal indicating whether the uplink signal is to be retransmitted;

considering the control signal as ACK when an absolute value of reception quality of the control signal is low, and determining whether the control signal indicates ACK or NACK based on information in the control signal when the absolute value of reception quality of the control signal is high;

wherein when the absolute value of reception quality of the control signal is high, considering the control signal as ACK when a sign of the information in the control signal is "+", and considering the control signal as NACK when the sign of the information in the control signal is "−"; and defining a predetermined threshold, considering the control signal as ACK when the absolute value of reception quality of the control signal is below the predetermined threshold, and determining whether the control signal indicates ACK or NACK based on information in the control signal when the absolute value of reception quality of the control signal is above the predetermined threshold.

* * * * *